Patented Feb. 16, 1926.

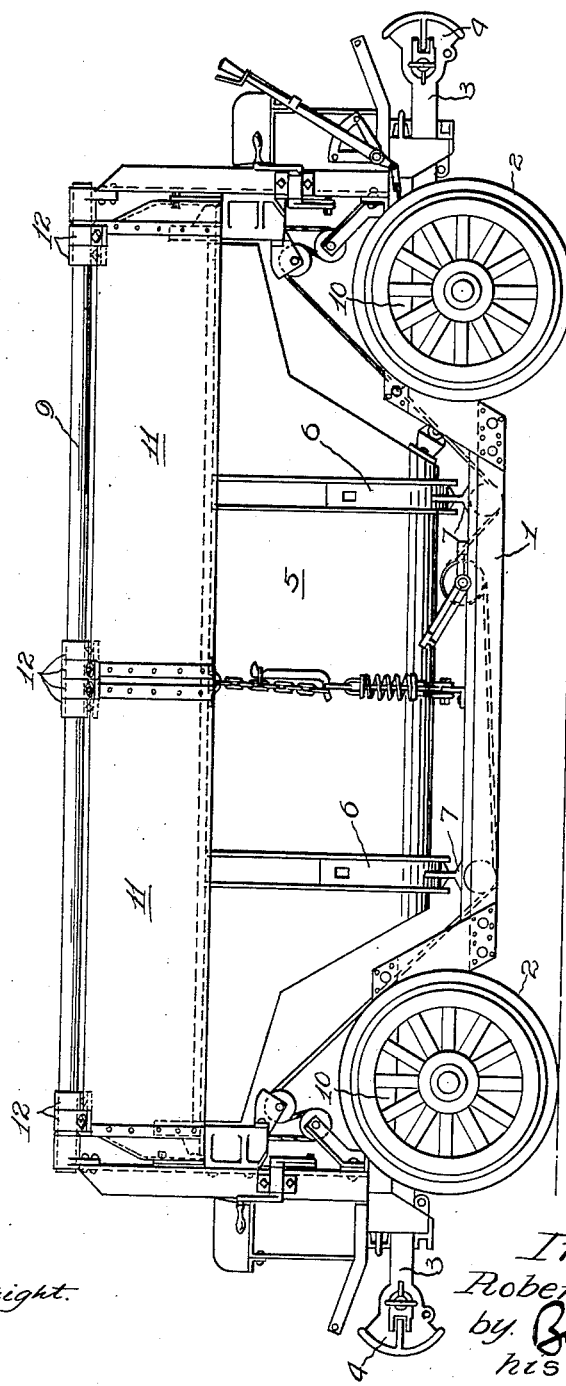

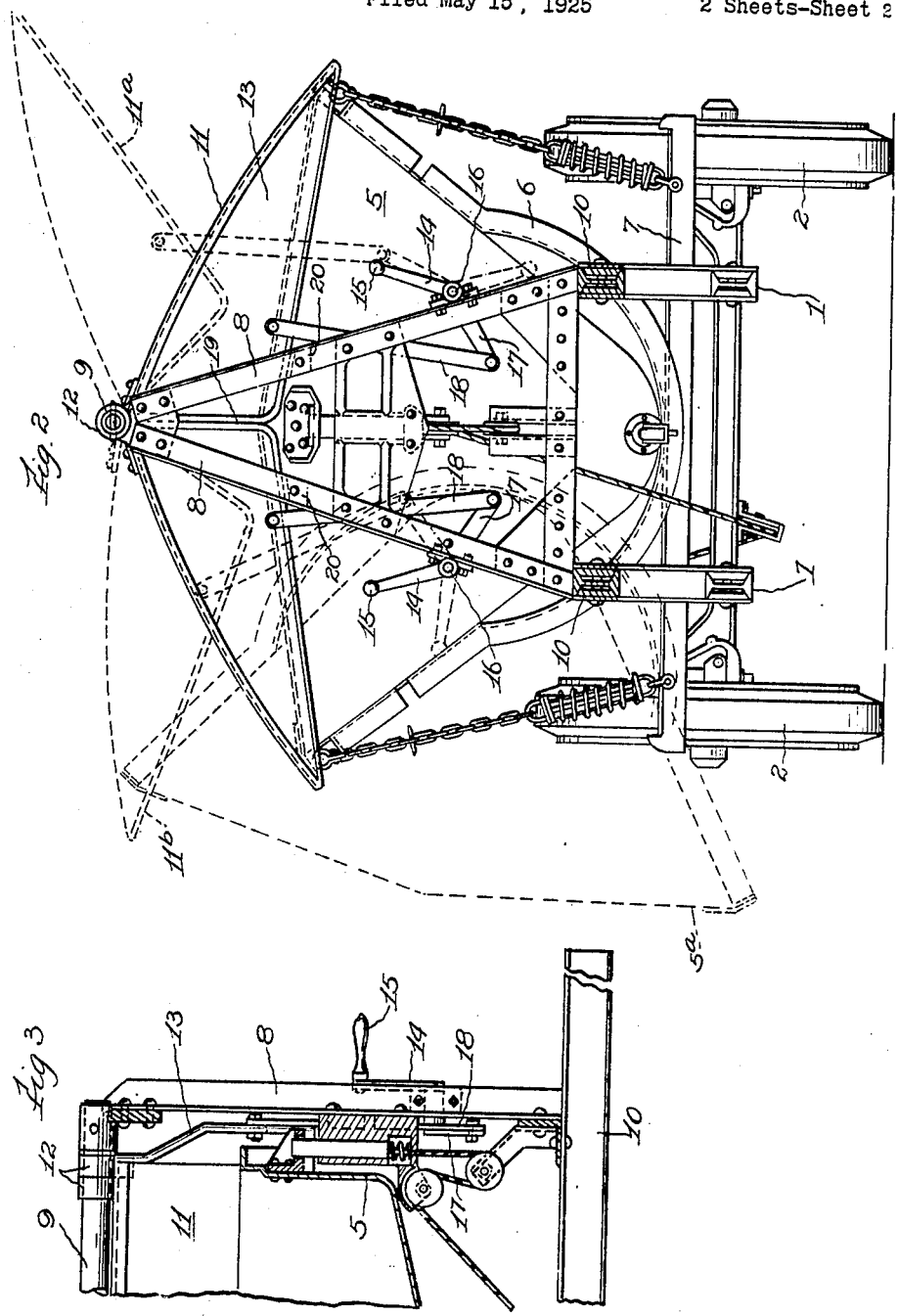

1,573,372

UNITED STATES PATENT OFFICE.

ROBERT N. BURTON, OF OAK PARK, ILLINOIS, ASSIGNOR TO HIGHWAY TRAILER COMPANY, OF EDGERTON, WISCONSIN, A CORPORATION OF WISCONSIN.

COVERED DUMP BODY.

Application filed May 15, 1925. Serial No. 30,520.

*To all whom it may concern:*

Be it known that I, ROBERT N. BURTON, a citizen of the United States, residing at Oak Park, in the county of Cook and the State of Illinois, have invented certain new and useful Improvements in Covered Dump Bodies, of which the following is a specification, reference being had to the accompanying drawings, forming a part thereof.

This invention relates to vehicle bodies of the hopper type in which the body is tiltably mounted upon a main frame of the vehicle to facilitate dumping its contents. The purpose of the invention is to provide a means for covering such a body in its load-carrying position without interfering with the dumping operation. It consists in certain features and elements of construction in combination, as here described and shown in the drawings and as indicated by the claims.

In the drawings:

Figure 1 is a side elevation of a trailer type of vehicle carrying a hopper body of the type which rolls laterally for discharging, and which is shown fitted with covers embodying this invention.

Figure 2 is an end elevation of the body and its support, but with the adjacent wheels and end portion of the frame removed for showing the body construction more clearly.

Figure 3 is a vertical detail section taken substantially at the medial plane of the body at one end.

In the construction illustrated, the trailer comprises a drop frame, 1, supported on four wheels, 2, all of which are preferably steering wheels having suitable connections with draw bars, 3, for control of the steering mechanism when they are attached to a tractor vehicle or pulled by a team of horses hitched to a tongue inserted in the coupler head, 4, of the draw-bar. Suitable locking mechanism, not shown, is provided for preventing steering movement of the rear pair of wheels when desired. The load-carrying body is in the form of an upwardly-open hopper, 5, fitted with rockers, 6, of channel section which are mounted to roll laterally upon cross rails, 7, carried by the drop frame so as to facilitate discharge of the load from the body when it is rolled over on its side to the position indicated at 5ª in dotted outline in Figure 2. The center of gravity of the hopper body, 5, is so located with respect to the rockers, 6, that the body may be readily returned to upright load-receiving position by hand. Therefore, it is desirable in providing any form of cover that the cover shall not be attached to the body since that would tend to shift the center of gravity upward so as to make it difficult to return the body from its dumping position to upright position by hand.

As shown in the drawings, an A-frame of angle members, 8, 8, is erected at each end of the body upon the end portion, 10, of the main frame, and a longitudinal member, 9, preferably in the form of a pipe, is supported by the A-frames over the center line of the body. For convenience, the covers, 11, are made in four parts, two at each side of the pipe, 9, and hinged thereto for swinging upwardly to the position shown in dotted lines at 11ª, on Figure 2 to permit loading the hopper body, 5. Each cover is fitted at its upper edge with a pair of rings, 12, encircling the pipe, 10, and serving as hinge members, and each cover may be provided at its outer end with a skirt or flange, 13, preferably depending slightly below the level of the upper edge of the hopper body, 5, and overlapping the latter.

For lifting the covers to loading position, each of them may be provided with a hand lever, 14, having a crank handle, 15, and fulcrumed at 16, on one member, 8, of the A-frame. A crank arm, 17, of the lever is connected by a link, 18, to any convenient point on the flange or skirt, 13, of the cover, so that when the crank handle, 15, is swung downwardly, the link, 18, rises and forces the cover upward. The arms, 14 and 17, of the lever may be related at such angles that the arm, 14, will stop against the member, 8, just after the arm, 17, has passed a directly vertical position, whereby the weight of the cover and the linkage will tend to lock the cover in open position.

The longitudinal supporting pipe, 9, is located at a point high enough above the transverse rails, 7, so that the lateral edge of the hopper body, 5, will pass under the pipe when the body is rolled over to dumping position. Preferably the covers, 11, are made slightly convex approximating the path of travel of the lateral edge of the body, 5, as it rolls over so that in the first half of said rolling movement the position of the covers is not affected, as they are stopped against each other in closed position by engagement of the vertical edges of their end flanges, 13, at 19, and thus hung in balance upon the pipe, 9. However, as the edge of the body passes under the pipe, 9, in the last half of its dumping movement, it will tend to raise one of the covers to the extent indicated in dotted lines at 11$^b$, on Figure 2. If it is desired to prevent the other cover from following this movement, it may be arrested by a stopblock on the rear face of the A-member, 8, at 20; or, if preferred, all the covers may be raised to the position indicated at 11$^a$, before the load is dumped.

I claim:—

1. In combination with a vehicle frame, an upwardly open hopper body mounted thereon for rolling to dumping position, a cover for the body supported independently of the body on the vehicle frame and means for raising and lowering the cover at will independently of the position of the body.

2. In combination with a verhicle frame, an upwardly open hopper body tiltably mounted thereon, a cover for the body supported independently of the body on the vehicle frame and means for holding said cover in open position with the body in its normal upwardly open load-carrying position to give access to the body for loading it.

3. In the combination defined in claim 2, said means being designed to lock automatically in position for holding the cover open.

4. In the combination defined in claim 2, said means being arranged to be locked automatically by the weight of the cover in position for holding the cover open.

5. In combination with a vehicle frame, and a tiltable body thereon, a fixed frame member extending in spaced relation over the body and a plurality of covers for the body hinged to said member, together with separate operating means for said covers respectively supported on the frame independently of the body and operable for opening and closing the covers independently of each other.

6. In combination with a vehicle frame and a laterally tiltable body thereon, a fixed frame member extending longitudinally in spaced relation above the body at the middle of its width and a plurality of covers for the body, said covers extending from opposite sides of said frame member and hinged thereto, together with means independent of the body for opening and closing said covers independently of each other.

7. In combination with a vehicle frame and a laterally tiltable body thereon, a fixed frame member extending longitudinally in spaced relation above the body at the middle of its width and a plurality of covers for the body extending from each side of said frame member and hinged thereto, together with upright frame members beyond the ends of the body supporting the longitudinal member and separate operating handles for the respective covers mounted on said uprights below the covers within reach of an operator standing on the ground beside the vehicle, with connecting linkage from each handle to its cover.

8. In combination with a vehicle frame and a hopper body mounted to roll thereon for discharging its load, a fixed frame member extending in spaced relation above the body at a height sufficient to allow the latter to pass under said frame member in its rolling movement, a cover hinged to said member to extend over the body when the latter is in normal load-carrying position, said cover being of upwardly convex form approximating the path of the edge of the body during the initial stages of the rolling movement thereof.

9. In combination with a vehicle frame and a tiltable hopper body thereon, a fixed frame member supported in spaced relation above the body at the middle of its width, a pair of covers both hinged to said fixed member and extending thereform in opposite directions over the body, each of said covers having an end flange with an edge extending vertically downward from the supporting member when the cover is in closed position, said vertical edges of the two covers abutting each other whereby the covers hang in balanced relation on said member.

ROBERT N. BURTON.